US011593751B2

(12) United States Patent
Shiely et al.

(10) Patent No.: US 11,593,751 B2
(45) Date of Patent: Feb. 28, 2023

(54) PRE-COORDINATING DELIVERY AND SERVICE INFORMATION FOR ITEM SEARCHING AND FILTERING

(71) Applicant: BBY SOLUTIONS, INC., Richfield, MN (US)

(72) Inventors: Brent Shiely, Eden Prairie, MN (US); Kevin Kokal, Eden Prairie, MN (US); Britta A. Martin, Plymouth, MN (US); Elizabeth E. Wright, Farmington, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 427 days.

(21) Appl. No.: 16/555,361

(22) Filed: Aug. 29, 2019

(65) Prior Publication Data

US 2020/0090119 A1    Mar. 19, 2020

Related U.S. Application Data

(60) Provisional application No. 62/731,389, filed on Sep. 14, 2018.

(51) Int. Cl.
*G06Q 30/00* (2012.01)
*G06Q 10/0835* (2023.01)
(Continued)

(52) U.S. Cl.
CPC ... *G06Q 10/0835* (2013.01); *G06Q 10/06311* (2013.01); *G06Q 30/0625* (2013.01); *G06Q 30/0633* (2013.01); *G06Q 30/0641* (2013.01)

(58) Field of Classification Search
None
See application file for complete search history.

(56) References Cited

U.S. PATENT DOCUMENTS 6,101,482 A    8/2000 DiAngelo et al.
7,904,975 B2 * 3/2011 Kruglikov .......... G06Q 30/0617
                                                  5/28

(Continued)

OTHER PUBLICATIONS

Zheng Qin, "Introduction to E-commerce", 2009, Springer, springer.com (Year: 2009).*

(Continued)

*Primary Examiner* — Michelle T Kringen
*Assistant Examiner* — Norman Donald Sutch, Jr.
(74) *Attorney, Agent, or Firm* — Schwegman, Lundberg & Woessner, P.A.

(57) ABSTRACT

Systems and techniques for pre-coordinating delivery and service for item searching and filtering are described herein. Large or specialized products, such as household appliances, may require setup and installation services at the time of delivery, leading to additional complexity and coordination from multiple service providers. The present techniques and system configurations address these complexities by providing functionality in search and information user interfaces, which enable a user to search, filter, and identify the delivery and installation availability for a listing of products. The present techniques and system configurations may calculate and cache the availability dates for service fulfillment of respective products. The present techniques and system configurations enable a user to request and receive a listing of the earliest available products for delivery and installation based on the cached availability dates for service fulfillment of respective products.

20 Claims, 10 Drawing Sheets

(51) Int. Cl.
*G06Q 30/0601* (2023.01)
*G06Q 10/0631* (2023.01)

(56) References Cited

U.S. PATENT DOCUMENTS

| | | | |
|---|---|---|---|
| 9,355,400 B1 | 5/2016 | Park et al. | |
| 10,163,070 B1* | 12/2018 | Phillips | G06Q 10/0834 |
| 2002/0082934 A1* | 6/2002 | Koda | G06Q 30/0621 |
| | | | 705/26.5 |
| 2004/0133458 A1* | 7/2004 | Hanrahan | G06Q 10/0631 |
| | | | 705/7.12 |
| 2006/0195365 A1* | 8/2006 | Karabetsos | G06Q 10/109 |
| | | | 705/7.19 |
| 2008/0168093 A1* | 7/2008 | De Marcken | G06F 16/24539 |
| 2010/0268661 A1* | 10/2010 | Levy | G06Q 30/02 |
| | | | 705/347 |
| 2012/0265632 A1 | 10/2012 | Patro | |
| 2013/0013454 A1 | 1/2013 | Sears | |
| 2013/0085895 A1* | 4/2013 | Lakshminarayanan | |
| | | | G06Q 10/00 |
| | | | 705/26.81 |
| 2015/0006336 A1* | 1/2015 | Vasantham | G06Q 10/087 |
| | | | 705/28 |
| 2017/0083967 A1* | 3/2017 | Shiely | G06Q 30/0641 |
| 2018/0268349 A1 | 9/2018 | Martinson et al. | |
| 2020/0034910 A1* | 1/2020 | Halbrook | G06Q 30/0631 |
| 2020/0043077 A1* | 2/2020 | Turner | G06Q 30/0601 |

OTHER PUBLICATIONS

Jakob Jenkov; "Caching Techniques"; Nov. 15, 2013; tutorials.jenkov.com (Year: 2013).*

Taeho Kim; "Delivery management system using the clustering based multiple ant colony algorithm: Korean home appliance delivery"; Jan. 2014; The International Journal of Industrial Engineering: Theory, Applications and Practice (Year: 2014).*

"eBay invites sellers to its new fast shipping program", [online]. Retrieved from the Internet: <URL: https://www.digitalcommerce360.com/2017/08/02/ebay-invites-sellers-fast-shipping-program/>, (Aug. 2, 2017), 10 pgs.

\* cited by examiner

Shop Category — 300

Built In Dishwashers
Portable & Countertop Dishwashers

Finish Color
☐ White (4) — 310A
☐ Black (6)
☐ Stainless Steel (20) — 310B

Features
☐ Hidden Controls
☐ Water Saving
Show more

Availability
☐ Pick Up Today (No Installation) — 310C
☐ Delivery By: — 310D ⌄
☐ Delivery and Installation By: — 310E ⌄

Search Results for: "dishwashers"

All Items (30)  Pick Up Today (2) — 330

Sort By: Earliest Install ⌄   My Store: EAGAN, MN   Zip Code 55123 (Change) — 320

ACME – 24" Tall Tub Built-in Dishwasher – Stainless Steel — 322A
🚚 Delivery: $99.99   Delivery with installation available Tomorrow! — 326A   $249.99
🏬 Store Pickup: EAGAN MN   Pick up Today — 324A   [ADD TO CART] — 328A

ApplianceCo – 24" Hidden Control Tall Tub Built-In Dishwasher with Stainless Steel Tub — 322B
🚚 Delivery: $59.99   Delivery with installation available Next Week — 326B   $449.99
🏬 Store Pickup: ROSEVILLE MN   Pick up Today — 324B   [ADD TO CART] — 328B

ApplianceCo – 24" Standard Tub Built-in Dishwasher – Black — 322C
🚚 Delivery: FREE   Delivery with installation available on 11/23/2018 — 326C   $349.99
🏬 Store Pickup: RICHFIELD MN   Pick up by 11/21/2018 — 324C   [ADD TO CART] — 328C

Search Results for: ACME Brand Washers — 420

All Items (3) | Pick Up Today (2) — 430

Sort By: Delivery Date ▽    My Store: EAGAN, MN    Zip Code 55123 (Change)

Shop Category
Dryers (30)
Washing Machines (30)
Washer Dryer Combos (2)

Color — 410A
☐ White (1)
☐ Black (1)
☐ Red (1)

Features — 410B
☐ Stackable
☐ High-Efficiency
Show more

Availability — 410C
☐ Pick Up Today
☐ Delivery Date — 410D

☒ Delivery and Install Date — 410E
11/23/2018

ACME – 4.5 Cu. Ft. 14 Cycle Front Loading Washer – Red — 422A
🚚 Delivery: FREE — 432  ✦ Delivery with installation available on 11/23/2018 — 424A
▦ Store Pickup: EAGAN MN  Pick up Today — 426A
$549.99  [ADD TO CART] — 428A ACME – 4.5 Cu. Ft. 12 Cycle Front Loading Washer – Black — 422B
🚚 Delivery: FREE  ✦ Delivery with installation available on 11/23/2018 — 424B
▦ Store Pickup: EAGAN MN  Pick up Today — 426B
$499.99  [ADD TO CART] — 428B ACME – 3.5 Cu. Ft. 14 Cycle Front Loading Washer – White — 422C
🚚 Delivery: FREE  ✦ Delivery with installation available on 11/23/2018 — 424C
▦ Store Pickup: RICHFIELD MN  Pick up by 11/21/2018 — 426C
$249.99  [ADD TO CART] — 428C

*FIG. 5*

PRE-COORDINATING DELIVERY AND SERVICE INFORMATION FOR ITEM SEARCHING AND FILTERING

TECHNICAL FIELD

Embodiments discussed herein generally relate to user interface functionality and search engine techniques used in electronic computing and communication systems. Certain embodiments discussed herein relate to techniques that select and display information related to physically large products in a user interface based on availability, geolocation, internal transit routes, and schedules.

BACKGROUND

Many online retailers offer expedited delivery services or guaranteed delivery dates for their products. These types of services may be available for a variety of products, from toothpaste to hardcover books. The commonality of the products that these delivery services are available for is that the products are commonly packed into a small box and delivered by a major parcel shipping service or the United States Postal Service. Additionally, these products are typically functional to the user upon delivery and do not require separate services or features.

There are other products which cannot be as easily guaranteed by a certain date while being functionally operational to the user. The largest category of such items is household appliances such as dishwashers, ovens, refrigerators, washers, and dryers. These items present additional delivery complexities because of their size. Additionally, these items typically require a trained service technician to install or configure such items in a person's home.

Further, determining a coordinated delivery and installation date for an appliance involves added factors that are not considered for most items. For example, specialized products such as household appliances often require setup and installation services at the time of delivery, leading to additional complexity and coordination from multiple service providers (e.g., coordinating work between an electrician, plumber, in addition to a product moving crew). Existing approaches for coordinating fulfillment of delivery and installation of specialized products often involves manual human involvement and observing multiple computing systems, which leads to incomplete or vague information about service availability and delivery times. Such existing processes may lead to unexpected and unreliable outcomes, and a lack of information for consumers with existing types of user interfaces.

Adding to the complexity, many times when a shopper is looking to purchase an appliance it is because their current appliance has broken, and the shopper is in need of a new appliance to be installed and functional as soon as possible. Existing user interfaces may allow filtering of results based on whether a product is currently in stock at a location (e.g., a store or warehouse), but such information may not reflect the installation and delivery service availability needed to make the product fully functional. As a result, reliable information about when an appliance may be delivered and installed for the shopper is not attainable by existing systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates a sample website user interface layout adapted to present and receive information and selection options for product delivery and services, according to various embodiments.

FIG. 4 illustrates a user interface layout adapted to present and receive information and selection options for product delivery and services, according to various embodiments.

FIG. 5 illustrates a user interface layout adapted to present and receive information and selection options for product delivery scheduling options, according to various embodiments.

DETAILED DESCRIPTION

Figure 1:
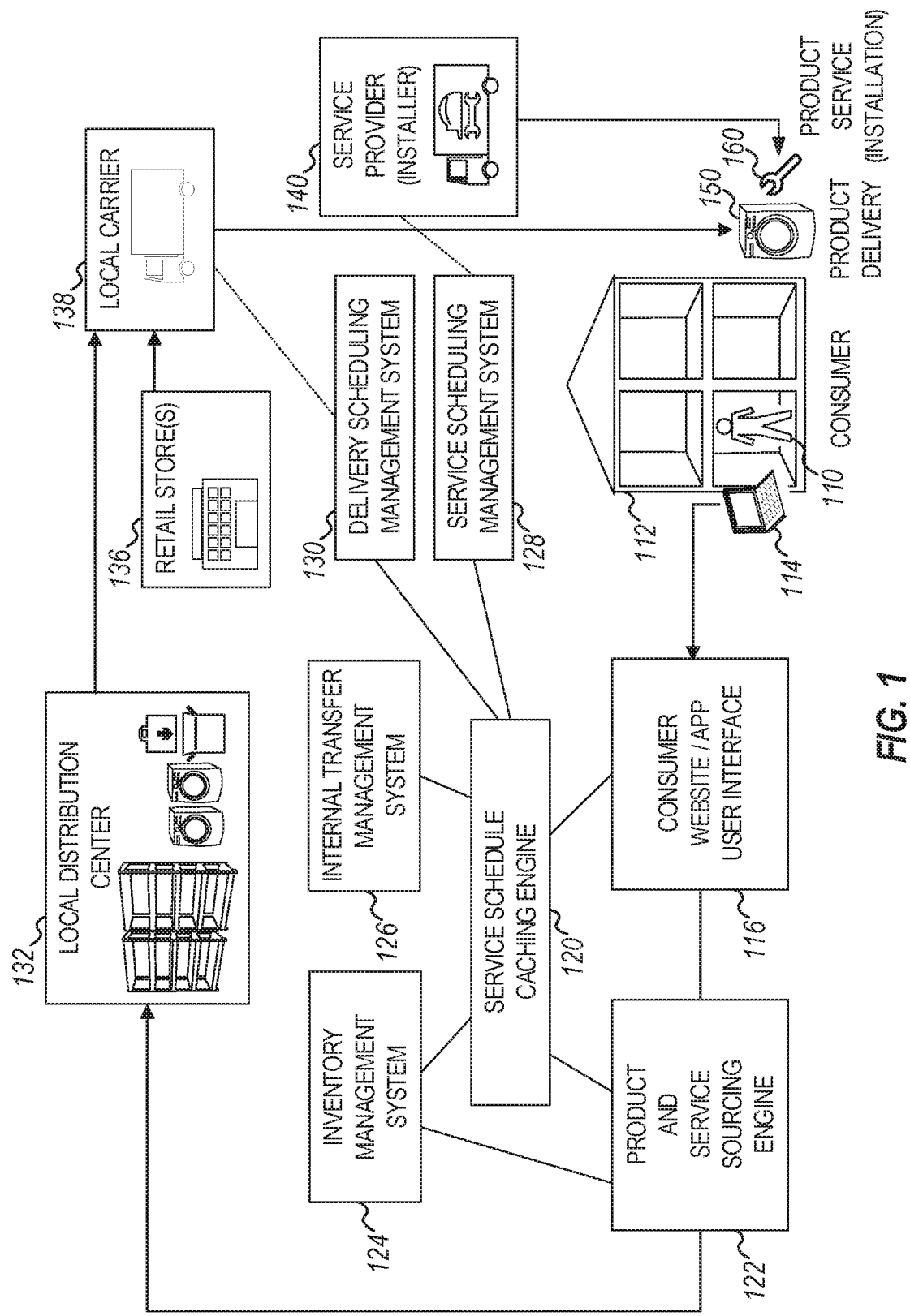
FIG. 1 illustrates an overview of a scenario for product delivery and product service (e.g., installation) scheduling performed with a user, according to various embodiments.

In many instances, when a shopper is searching for an appliance, they are in need of a new appliance because their current appliance is broken. This may place the shopper in a distressed state while attempting to find an appliance to suit their needs that can be operational as soon as possible. While the shopper is interested in finding a product that fulfills their needs, they may be most concerned with the timing of the delivery and installation to reduce the inconvenience of the broken appliance. A shopper may spend time researching and selecting a product of their choice to replace the broken appliance. The shopper, who may already be distressed from having to make an unplanned purchase, may be further aggravated to find it will take two weeks for the product to be delivered and installed, and discover this information only after making their selection and proceeding to checkout. The distressed shopper's primary concern may be the availability of delivery and installation. Thus, the shopper may prefer to be presented only with products which are guaranteed to satisfy their delivery and installation needs.

The present techniques and system configurations attempt to address these issues by providing functionality in search and information user interfaces, which enable a user to search, filter, and identify the delivery and installation availability for a listing of products. Such functionality enables a user to request and receive a listing of the earliest available products for delivery and installation. Thus, if the user's primary concern is to identify a new appliance in their home which can be purchased, delivered, and installed in the shortest amount of time, the user can request specific results of the products that are available to satisfy that requirement.

While the discussion of the techniques and configurations discussed herein focus on home appliances, the same techniques and configurations may be applied to many products which may need coordination between availability, delivery truck space, delivery timing, and/or installation, such as large screen televisions, audio/visual equipment, home automation or security systems, office equipment, and the like. The techniques and configurations may apply to other products with similar complexities, including in both home and business settings, such as automotive windshield replacement, audio system installation, fine art transportation and installation, piano movers, or a plant nursery which delivers and plants trees for customers, among many other examples.

The present techniques provide a large product pre-coordinating search engine for identifying large products matching a user specification and providing the user with a display of the products matching a time table based on availability, transit timing and space, and installation availability. The results may be selected based on a location of the customer (e.g., a detected zip code for the customer, customer provided zip code, other geolocation information, etc.), a customer specified date or date range, and the coordination of the product availability near the user, retailer's delivery schedule, delivery capacity, and installer availability. For example, a user may select the type of appliance they are interested in, such as a dishwasher, and a date that they desire to have a dishwasher delivered and installed. The pre-coordinating search engine uses data indexed for the product availability of dishwashers near the user, combined with delivery vehicles and availability of a service person capable of installing a dishwasher. The delivery vehicle must have both space on the delivery vehicle for a dishwasher and scheduling availability to pick up the dishwasher and transport it to the user's location.

The large product pre-coordinating search engine provides capabilities for searching of products that may have availability, delivery, and installation constraints to be coordinated on a specific date near a relative location. Many common online retail search engines perform a customer-directed search based on limited inventory availability of a requested product or product type. Any delivery availability with such conventional systems consists of little more than determining if a product is in-stock and the location of the product, then based on the location calculating a standard shipping time to the user provided zip code or utilizing a parcel service with a guaranteed shipping time service (e.g., guaranteed two-day shipping). This is a one-dimensional problem requiring no more than using the origination and the destination to look up standard shipping times on a chart.

The large product pre-coordinating search engine discussed herein uses indexed delivery and installation data values to drive the search results. Based on the availability of delivery (including vehicle schedule and capacity) and installation services for particular dates, times, or date/time windows, the products which may correspond to such dates or times are selected for presentation to the user. The large product pre-coordinating search engine similarly evaluates the product inventory location and the destination location, while allowing multiple dimensions of availability, shipping, delivery, and installation constraints to factor into coordinating the product delivery and service.

The examples discussed herein are directed to techniques implemented within one or more computing systems that provide an online product delivery and services scheduling architecture. As discussed herein, various types of cached, pre-calculated, indexed, and estimated representations of product delivery and service schedule availability may be provided through a user interface, to improve the speed and functionality of a user interface and associated network communication transactions. In an example, a cached data management technique is used to enable fast consumer identification and selection of in-home services, including to determine availability for delivery and service scheduling time slots without needing to immediately contact and query an external scheduling system.

The large product pre-coordinating technique may further enable a delivery and installation date to be displayed for a general product listing (e.g., a listing or category of dishwashers with no specific features specified, such as brand or price range). The large product pre-coordinating technique may further enable a user to select a specific date for delivery and installation, resulting in a listing of all items for that product type (e.g., refrigerators, ovens) or product sub-type (e.g., brand or size) that are available for delivery and installation on the specified date. The large product pre-coordinating technique may enable a user to specify a date range instead of a single date, or even specify a time frame for a specific date.

As further discussed herein, the techniques herein also may enable delivery and installation dates to be cached and indexed for retrieval by a web server to be displayed during product browsing, including in a list of products or searched results. This results in a faster time to populate a calendar and receive customer selections for in-home delivery and scheduling appointments, increasing the speed of an application or website during customer checkout and improving resulting customer experiences and data transactions. The caching and indexing techniques used herein also may be used to improve the stability and performance of an application or website user interface, by reducing the number of data transactions and calls to external services, thus improving the reliability of associated systems. The caching and indexing techniques discussed herein may also improve the stability and performance of external scheduling services by reducing the volumes of transactions from an associated website or app interface that would otherwise be used to query delivery and installation data.

In an example, a product search engine may utilize a common database with indexed data to store and retrieve information about a product. Based on the simplicity of the data structures the queries may be performed relatively quickly. Performing calculations, such as determining available delivery times, may be reserved until after a user has selected an item from the search results as these calculations may be time consuming to calculate during the query. The techniques and methods described herein perform a calculation on continuous intervals to pre-coordinate the availability of delivery and service times for a set of products. The calculated results are stored and made accessible to the product search engine to deliver the calculated results in a time and presentation similar to a common product search.

The techniques discussed herein are presented in the context of an architecture that is used to display a user interface for electronic commerce settings, for the sale and scheduling of product transactions, product delivery, and associated services such as product setup and installation. The techniques discussed herein allow further separation between selling functionality and scheduling functionality, to provide greater flexibility to optimize business requirements and system operations. It will be understood, however, that the information pre-calculation and caching techniques discussed herein may also be applicable to other types of user interfaces and architectures, including those not directly involving a sale of a product or service.

FIG. 1 illustrates an overview of a scenario for product delivery and product service (e.g., installation) scheduling performed with a user according to an example described herein. As shown, a user 110 is located at a user location 112 (e.g., a home), and operates a computing device 114 to access a user interface 116. In an example, the user interface 116 is a website or software application interface (e.g., a data service presented by a web server or an "app") that is used for electronic commerce. In the scenario of FIG. 1, the user 110 uses the user interface 116 to browse, purchase, and schedule a product delivery 150 and product service 160. An example arrangement of a portion of the user interface 116 is provided in FIG. 3 and FIG. 4 and further discussed below.

The user interface 116 may be hosted or exposed by an internet-accessible service on behalf of an entity, such as a retailer. The user 110 may use the user interface 116 to browse, purchase, and schedule a product service 160 for the particular product (e.g., installation and setup of the washer), such as at the time of scheduling the product delivery 150 in the consumer user interface 116 (e.g., in the same browsing session or in a subsequent browsing session). The user interface 116 may present various forms of data, in the form of text, graphics, and video, relating to the purchase or specification of the product delivery 150 and the product service 160. The user interface 116 may obtain this information from various data systems and data sources, such as those maintained by the business entity or an associated service provider.

The user interface 116 may include various presentations of information for product delivery and product service scheduling purposes, including presentations of information that are obtained from the cached data representations for product delivery and service schedule availability. For example, a cached availability calendar may be provided in the user interface 116 with information provided from the cached data representations for product delivery and service schedule availability in lieu of directly contacting a separate delivery or scheduling service. The functionality for generating such cached data for a product service is depicted in FIG. 1 as being operated within a service scheduling caching engine 120. The user interface 116 may provide commands and requests to a product and service sourcing engine 122 for scheduling and coordination of the product purchase, product delivery, and the product service.

The user interface 116 may present a product listing based on information obtained from the user 110, such as the user location and general product of interest, with additional refinement based on additional specifications provided by the user, such as a preferred brand. The product listing may include indications for available delivery and service for each product in the listing based on information obtained from the cached data source. For example, earliest available delivery and installation dates may be displayed in the user interface 116 with information provided from the cached data source in lieu of directly contacting a delivery or scheduling service.

In an example, the service schedule caching engine 120 is used to present information for cached data availability for product delivery, product service, or combined delivery and service. The service schedule caching engine 120 may coordinate operations with the use of an inventory management system 124 and an internal transfer management system 126, which determines how and when a particular item can be fulfilled. For example, the inventory management system 124 may identify available inventory of a particular product type (e.g., a product type identified by stock-keeping unit (SKU), universal product code (UPC), manufacturer and model identifier, etc.) and a source of a particular product or product specification (e.g., from a retail store, from a distribution center, from a manufacturer); the internal transfer management system 126 may be used to identify schedule constraints and characteristics of logistics to transfer the product among internal channels (e.g., an internal or private distribution or transit network). The service schedule caching engine 120 is further used to coordinate operations with a delivery scheduling management system 130, which processes and facilitates requests for the product delivery 150, and a service scheduling management system 128 which processes and facilitates requests for the product service 160 to accompany, precede, or follow the product delivery 150. In respective examples, the delivery scheduling management system 130 and the service scheduling management system 128 are legacy systems, combined systems, or systems operated or hosted by a third party. In response to a purchase command or other commerce action for the product and service, the product and service sourcing engine 122 operates to coordinate transportation and delivery.

The service schedule caching engine 120 may perform pre-calculations to determine what may be the first available date for a delivery and installation for a zip code and product type. The pre-calculation may be performed for a select set of most common zip codes or for all zip codes. The pre-calculation may be performed for a set of the most popular models. SKUs. or product identifiers of a product type. The pre-calculation may include a combination of availability of products and their location, cross-referenced with delivery vehicle schedules (including times and locations) and capacity, and cross-referenced with service schedules. The results of the pre-calculation are indexed and cached such that the information is readily accessible when the user 110 performs a search through the user interface 116. The information that is cached may be dynamic based on continuously changing factors. For example, the products chosen for pre-calculation caching may change based on customer demand.

As shown, the fulfillment of the product delivery 150 and the product service 160 may be coordinated through multiple locations (e.g., "hops" among internal distribution network nodes) and actions that facilitate the transportation and movement of a product to the user location 112. The product may be transported from a local distribution center 132 or retail store 136 by the local carrier 138 to the user location 112 for product delivery 150 and product service 160. A particular event (e.g., date and time, or range of time) for the product delivery 150 from the local carrier 138 may be coordinated via the delivery scheduling management system 130, and a particular event (e.g., date and time, or range of time) for the product service 160 from a service provider 140 (e.g., an installer) may be coordinated via the service scheduling management system 128. In other examples, the fulfillment of the product delivery 150 may be provided by third party shipping carriers, or the fulfillment of the product service 160 may be provided via third party contractors.

In an example using the scenario depicted in FIG. 1, a user 110 may access a website user interface 116 from a computing device 114. The user 110 may indicate in the user interface 116 they are interested in dishwashers which could be delivered on the fifth of the month. The user 110 may indicate their location. The location information may be entered directly by the user or from the user's profile. The location may also be obtained indirectly such as through location information provided through the internet service provider. The product and service sourcing engine 122 may communicate with the inventory management system 124 to determine dishwashers which are available at a local distribution center 132 and any retail stores 136 within a locality near the user 110.

The product and service sourcing engine 122 may provide the locations (e.g., the distribution center location and retail store locations) to the service schedule caching engine 120. The service schedule caching engine 120 may retrieve scheduling, route, and capacity information from the delivery scheduling management system 130. The service schedule caching engine 120 may retrieve service provider scheduling information from the service scheduling management system 128. The service schedule caching engine 120 may coordinate the information about product location with the scheduling, mute, and capacity information, and the service provider availability to determine the products which may satisfy the specified date request.

Many combinations of factors may contribute to determining the products which may satisfy the request. For example, product A may be available at a retail location near user 110, however the delivery vehicle for that location is fully scheduled for the date. Product B may be available at a location further away from user 110, but the delivery vehicle for that location is already scheduled for a delivery near user 110 and has capacity for another product. As a result, product B can be identified as an available product for delivery on the specified date. The service schedule caching engine 120 analyzes and coordinates multiple factors such as these to determine and index the delivery possibilities for each available product.

In an example, an estimated product delivery and product service date, date range, or time window may be presented and searched via a user interface on the consumer computing device 114. These dates may be offered through technical, back-end improvements to the user interface served from the use of cached and/or index data, with the cached and/or indexed data being stored and updated via asynchronous transactions that identify available delivery, service, and availability information. Such caching and indexing techniques provide a significant advantage over a conventional request-response model that is performed synchronously with a scheduling service, such as a transaction that would need to be performed with the delivery scheduling management system 130 or the service scheduling management system 128 in real time.

Additionally, the data used to produce the estimated product delivery and product service times may be updated through optimization and estimated adjustments in the cached large product pre-coordinating search engine. This optimization may be provided through an evaluation of the most-likely-next-scheduled service, to predict "low-risk" availability for time windows that can fulfill the delivery or service scheduling time. This low-risk availability information may be updated asynchronously via reconciliation and updates outside of (e.g., before) a customer shopping session.

Figure 2:
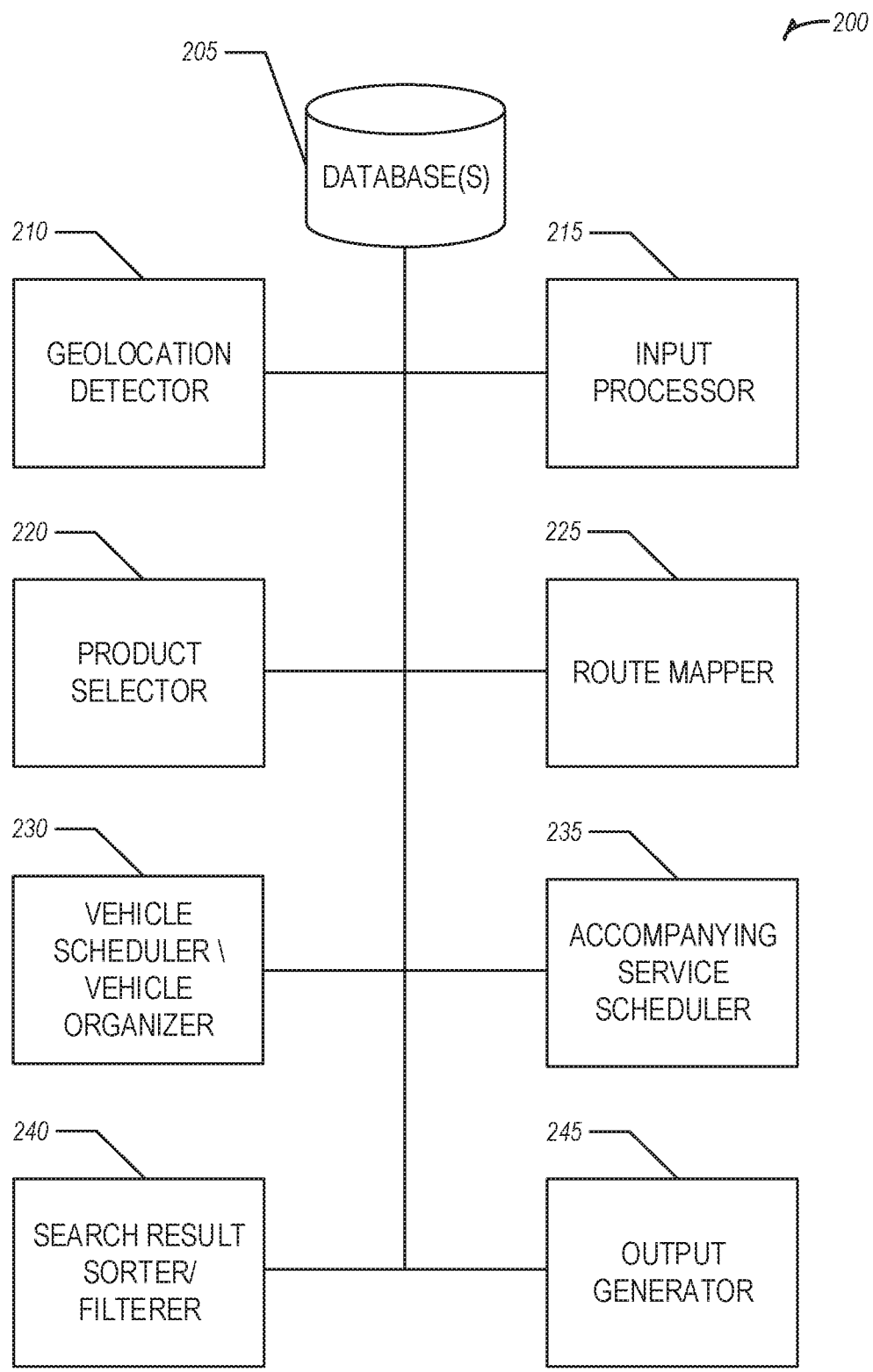
FIG. 2 illustrates a block diagram of an example of a system for a large product pre-coordinating search engine, according to various embodiments.

FIG. 2 illustrates a block diagram of an example of a system 200 for a large product pre-coordinating search engine, according to an embodiment. The system 200 may include a variety of components including database(s) 205, geolocation detector 210, input processor 215, product selector 220, route mapper 225, vehicle scheduler and vehicle organizer 230, accompanying service scheduler 235, search result sorter/filterer 240, and output generator 245.

The present subject matter may be implemented in various configurations. For example, the database(s) 205, the geolocation detector 210, the input processor 215, the product selector 220, the route mapper 225, the vehicle scheduler and vehicle organizer 230, the accompanying service scheduler 235, the search result sorter/filterer 240, and the output generator 245 may be implemented in different (or the same) computing systems (e.g., a single server, a collection of servers, a cloud-based computing platform, etc.). A computing system may comprise one or more processors (e.g., hardware processor 902 described in FIG. 9, etc.) that execute software instructions, such as those used to define a software or computer program, stored in a computer-readable storage medium such as a memory device (e.g., a main memory 904 and a static memory 906 as described in FIG. 9, a Flash memory, random access memory (RAM), or any other type of volatile or non-volatile memory that stores instructions), or a storage device (e.g., a disk drive, or an optical drive). Alternatively, or additionally, the computing system may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

The database(s) 205 may include a variety of data that may be used by the system 200 while in operation. For example, the database(s) 205 may include inventory data including product availability for retail stores and distribution centers, delivery vehicle locations, delivery vehicle schedules, delivery vehicle characteristics (e.g., capacity), previously scheduled deliveries and services, product information (e.g., SKUs, manufacturer and model information, product model or product serial numbers, size, weight, description, etc.), and the like.

The geolocation detector 210 may detect the location of a user of a website or application. For example, the geolocation detector 210 may compare an internet protocol (IP) address of the user to a list of IP addresses and locations and may detect the location of the user based on the comparison. In another example, the website may include a profile feature for maintain a profile for the user and the geolocation detector 210 may detect the location of the user using the profile information. In another example, the user may use an application on a mobile device and the geolocation detector 210 may receive the location of the user from a global positioning system (GPS) locator on the device. The geolocation detector 210 may output the location of the user for use by other components of the system 200. For example, the geolocation detector 210 may output a zip code for the user.

The input processor 215 may receive and process incoming data. For example, the input processor 215 may receive a search query from a website user interface. For example, a consumer may enter "washing machine" into a search query text field on a consumer website interface (e.g., user interface 110 as described in FIG. 1) and submit the query. The input processor 215 may receive the search query text and may prepare (e.g., format, reorder, etc.) the search query text for use by the product selector 220. In some examples, the input processor 215 may receive inputs (e.g., button clicks, check box selections, link selections, etc.) from the website interface and may route corresponding commands to other components of the system 200. For example, the input processor 215 may receive a date from the website interface which indicates a desired delivery and installation date, which is routed to components of the system 200, such as the route mapper 225, the vehicle scheduler and vehicle organizer 230, and the accompanying service scheduler 235.

The product selector 220 may select products from a list of available products based on a match (e.g., keyword, product name, item number, etc.) between the received search query text and products in the list. For example, a variety of washing machines included in the product list may be returned by the product selector in response to receiving a search query including the text "washing machine." In some examples, the product selector 220 may use the location output by the geolocation detector 210 to select products that are available for the location. For example, the list of products may include a list of retail locations to which the product is available and the product selector 220 may cross-reference the location to the list of retail locations when selecting products.

The product selector 220 may select products based on local availability (e.g., for pickup in a store near the user's location, etc.) and based on deliverability (e.g., for delivery to the user's location). For example, the product selector 220 may select washing machine A because the washing machine is available for pickup in a store in the user's zip code and may select washing machine B because the washing machine is available for delivery to the user's zip code.

The route mapper 225 may select a location for obtaining a product and may generate a route map for delivering the product to the user. In some examples, the route mapper 225 may identify the locations a delivery vehicle is currently scheduled to make deliveries to and determine if the location of the user may be a part of currently scheduled route for the delivery vehicle. For example, a user may have a delivery location within the delivery radius of the delivery vehicle, but near the eastern edge of the delivery radius. The delivery vehicle may be scheduled for three deliveries, but those deliveries take the delivery vehicle towards the western edge of the delivery radius. Thus, while the user is located within the delivery radius, the route mapper 225 may determine that based on the currently scheduled deliveries, it would not be possible to make the delivery to the user.

The vehicle scheduler and vehicle organizer 230 may record the times and locations a delivery vehicle is scheduled. The vehicle scheduler and vehicle organizer 230 may record the items currently scheduled to be placed on the delivery vehicle. The vehicle scheduler and vehicle organizer 230 may use a route map or delivery location map generated by the route mapper 225. The user may specify a date for delivery and installation and the vehicle scheduler and vehicle organizer 230 may determine the available delivery vehicles that have availability in their schedule for a delivery on that date. The available delivery vehicles may be narrowed by the location information provided by the geolocation detector 210. The available delivery vehicles may further be narrowed based on the capacity of the delivery vehicle, the products currently scheduled for delivery on the vehicle, and the product the user may be requesting delivery for. The vehicle scheduler and vehicle organizer 230 may receive product information (e.g., size) from the product selector 220 for the products currently scheduled on the delivery vehicle and the requested product. The vehicle scheduler and vehicle organizer 230 may receive product availability information from the product selector 220 to determine the delivery vehicles associated with each location that has the product in stock or a delivery vehicle that may pick up the product from the location. The route mapper 225 may provide route or location information for the delivery vehicle to the vehicle scheduler and vehicle organizer 230 for determining if the delivery vehicle may retrieve the product.

In an example, a delivery vehicle may be scheduled for three deliveries in a determined time period, leaving availability for a fourth delivery. However, the vehicle scheduler and vehicle organizer 230 receives information from the product selector 220 that the requested item is a refrigerator. The vehicle scheduler and vehicle organizer 230 may determine the delivery vehicle does not have the capacity for a refrigerator, and thus the delivery vehicle is not available for the delivery of a refrigerator at that time period. If the system receives a similar request, but for a dishwasher, the vehicle scheduler and vehicle organizer 230 may determine the delivery vehicle does have capacity for a delivery at that time period.

In some examples, the vehicle scheduler and vehicle organizer 230 may work in conjunction with the accompanying service scheduler 235 to determine availability of corresponding services such as product installation. For example, the servicing location may offer installation services and the product may be delivered and installed by an installation team. The accompanying service scheduler 235 may use the transit time calculated by the vehicle scheduler and vehicle organizer 230 to generate a schedule for accompanying services. For example, the vehicle scheduler and vehicle organizer 230 may have determined a delivery of a dishwasher is available on June 23. The accompanying service scheduler 235 may then determine if a dishwasher installer is available on June 23. If the accompanying service scheduler 235 determines the installer is not available on June 23, then the vehicle scheduler and vehicle organizer 230 determines delivery and installation for the dishwasher is not available. The installer may accompany the product on the delivery vehicle or arrive separately at the delivery and installation location.

The search result sorter/filterer 240 may sort and/or filter search results based on a variety of factors. For example, products that are unavailable for local pickup or delivery may be suppressed or may be placed at the bottom of the search results, products in the search results may be sorted based on local pickup dates and/or delivery dates, popularity, reviews, etc. The search result sorter/filterer 240 may work in conjunction with the output generator 245 to output search results for display on the website interface.

The output generator 245 may format output or otherwise prepare the outputs generated by components of the system 200 for display on the website interface. The output generator 245 may present the products selected by the product selector 220 along with corresponding delivery dates and local availability dates calculated by the vehicle scheduler and vehicle organizer 230 and accompanying service dates calculated by the accompanying service scheduler 235. The output generator 245 may present each product with an interactive display element that may be used to add the product to an electronic shopping cart. For example, an ACME washing machine may be presented with an Add to Cart button. In some examples, the output generator 245 may replace the interactive display element with a message indicating the product is unavailable if the product does not have a corresponding local availability date or delivery date. The output generator 245 may format the output of a product with a badge to indicate the delivery and service specifics requested by the user are available for the product.

The user may select the interactive display element and may add a product from the search results to an electronic shopping cart. The input processor 215 may detect the selection of the item and may decrement an inventory count for the item from the source location indicated by the vehicle scheduler and vehicle organizer 230. If the product was selected for delivery, the delivery unit count for the servicing location may be decremented for the delivery date. If the product was selected for delivery, the delivery vehicle capacity may be decremented based on the size of the product. If the product was selected for an accompanying service, a service schedule unit may be decremented for the servicing location for the accompanying service date. Thus, the product inventory, delivery, and accompanying service capacity for the product selected by the user is reserved while the product is in the user's electronic cart, preventing other users from taking the product inventory, delivery date slot, and/or accompanying service slot while the user finalizes the purchase.

The delivery and service of a large product requires constrained and limited resources not found with parcel services. The size of the large products limits both the number of items that may be held in stock at any point in time and the location of the large products. For example, a first location may have three of Large Product A in stock, but a second location may not have any of Large Product A. However, because of the size and thus the cost of transporting Large Product A, the second location may remain without Large Product A as it is not cost effective to balance the inventory between the locations.

The delivery of a large product is also constrained and limited by the size of the products. The size limits the number of products which may be held on a delivery vehicle at any one time. Delivery vehicles may be additionally limited based on the locale. For example, a metropolitan area may have large delivery trucks, but a more remote or rural location may be limited to a van for performing deliveries. The size of the products also limits the time available for performing the delivery. Unlike parcel delivery services, where a delivery consists of dropping a package by the front door of a residence, the delivery of a large product may require two people and a significant amount of time to maneuver the large product into the home. The delivery may be further complicated by factors such as delivering to an apartment on an upper floor of the apartment building.

Many large products, such as appliances or large pieces of art, require a service with the delivery of the product, such as connecting plumbing for a dishwasher or hanging the art. The location and schedule of the service technician may also constrain the delivery and service coordination to provide a timely service with the delivery. The availability of the service technician may be further limited by the skills of the service technician. For example, a service technician may have a plumbing skill set for installing dishwashers and laundry machines, but does not have the skill set for installing oven ranges.

The large product pre-coordinating search engine discussed herein evaluates such multi-dimensional factors and constraints in a pre-coordination calculation, to pre-determine the dates that a particular product may have available delivery and service dates for a locality or region (e.g., a zip code). In an example, the pre-coordination calculation may be performed at regular intervals, and the results of such calculation are cached to allow easy retrieval and searching. As a result, the large product pre-coordinating search engine can provide an up-to-date precise estimation of combined delivery, service, and installation availability in minimal time, without needing to query external systems or provide imprecise time windows.

For example, the large product pre-coordinating search engine may determine that for source Location A there is delivery and installation available for July 15, but source Location B does not have delivery and installation available for July 15. Location A has stock of Product 1, and Location B has stock of Product 2 and Product 3. Thus, while Location B has more products on hand to offer the customer, the customer may only be presented with Product 1 from Location A, as only Location A may fulfill the delivery and installation needs of the customer.

The transportation and delivery of large items such as appliances presents challenges different from smaller items, but the type of large item may also limit the delivery availability of the delivery vehicle and accompanying scheduling constraints. Delivery vehicles may vary in size, thus constraining the number of large items which may be held on the vehicle at any one time. For example, large metropolitan areas may have large delivery trucks capable of holding a range of at least five to ten large items at any one time. More rural areas may have a delivery van that is capable of transporting one or two large items at one time. Additionally, the type of large item may limit the space available on the delivery vehicle. For example, the space needed for a refrigerator may instead accommodate two dishwashers. Thus, the delivery vehicle capacity or space availability is not simply a tally of the number of large products on the delivery vehicle at one time, but instead considers the size of the large product to determine the actual space consumed by the large products held on the delivery vehicle. This type of space tracking and management provides both better options for the user, when possible, but maximizes the retailer's delivery productivity. As an example, a first user may have scheduled a dishwasher to be delivered on Wednesday. A second user shopping for a refrigerator may find that the first delivery date available may be Thursday as the delivery van cannot accommodate both a dishwasher and a refrigerator. However, a third user shopping for a dishwasher may find that a delivery for Wednesday is still available for their dishwasher, because the delivery van may hold two dishwashers.

In another embodiment, instead of the large product pre-coordinating search engine pre-determining delivery with trucks that may travel anywhere in a region with possible restrictions based on existing deliveries, the large product pre-coordinating search engine may pre-determine possible delivery for a product where the delivery vehicles have known destinations, or zones. Each day, or designated day, a delivery vehicle may have a designated delivery zone. For example, a metropolitan region may be divided into four square quadrants. Each day a delivery vehicle is assigned to each quadrant. Essentially, a delivery is possible for an address if the delivery vehicle for the zone the address is located in has available space for an item.

The large product pre-coordinating search engine performs the pre-coordination calculation based on the known delivery zone for each vehicle. As deliveries are scheduled for each vehicle, the pre-coordination calculations are updated to reflect the remaining possible delivery options. For example, once all the space on delivery vehicle for a particular zone for a particular day is scheduled, then deliveries for that particular zone and that particular day are no longer available. In another example, the delivery vehicle for zone A can carry two dishwashers and a refrigerator at one time. On Tuesday, the delivery vehicle for zone A is currently scheduled for a refrigerator and dishwasher delivery, thus zone A is updated to reflect that a dishwasher may be still be delivered on Tuesday, but not a refrigerator.

The large product pre-coordinating search engine may be configured to perform pre-coordination calculations for each warehouse. A warehouse may have an inventory of products, with the inventory data stored in a database. The warehouse may have a fleet of delivery vehicles, with each delivery vehicle designated to a delivery zone. Using the inventory and delivery zone information, along with currently scheduled deliveries, a pre-coordination calculation may be performed for each warehouse and the zones served by the warehouse. This type of pre-coordination calculation may be useful in large metropolitan areas with restrictive access routes, such as Manhattan in New York City. The warehouse capacity and location may be limited, thus by designating delivery zones for delivery vehicles it may ensure that deliveries for a certain area are guaranteed.

FIG. 3 illustrates a sample website user interface layout 300 adapted to present and receive information and selection options for product delivery and services according to an example described herein. For example, the user interface layout 300 may embody features of the user interface 116 described above. The sample website user interface layout 300 includes a user interface control to refine the search results based on an availability, including the options to select items for same day pickup, specify a date for delivery, or specify a date for delivery and installation. It will be understood that the example of the user interface layout 300 is not limited to the presentation of appliances, as other types of products, product features, and accompanying services may also be presented or advertised.

The user interface layout 300 specifically depicts the listing of three products for purchase, in addition to search options (310A-310E) that may refine or limit the search results. As shown, the search options include a series of user interface checkboxes that allow the inclusion or exclusion based on product features (product color 310A and product capabilities 310B), and availability, specifying options to either pick up the item today (310C), a delivery date for the product (310D), or a delivery and installation date for the product (310E), with installation being an example type of service that is offered to accompany the product. For example, a consumer may choose to select one or more of the user interface checkboxes to expand or limit the search results 320. Further, the presented search results may be limited by delivery or pickup criteria, such as a selection option 330 to present only search results that are available for immediate pick up at a location.

The information that is presented in the search results 320 may include product delivery dates and product service dates, produced from the cached availability of scheduling and service evaluated by the large product pre-coordinating search engine discussed above. The selections by a user, such as specifying a product type and a delivery and installation date, may be used to refine the products listed. If the user selects an availability option (310C, 310D, or 310E), the products listed may be refined based on the availability option. Accompanying each product listing is an indication of availability (326A, 326B, and 326C). The large product pre-coordinating search engine determines and supplies the information for display of the delivery and installation availability. For example, information presented for a first product may include a corresponding first delivery charge 322A, a store pickup date 324A, and a delivery with installation service date 326A; the information presented for a second and third product may include a corresponding second and third delivery charge 322B, 322C, a store pickup date 324B, 324C, and a delivery with installation service date 326B, 326C. Each of the search results may include a purchase selection option, such as respective "Add to Cart" buttons 328A, 328B, 328C for the first, second, and third buttons.

As an example, a user may select a general product type they are interested in. For example, a distressed user may have a broken dishwasher and visits a retailer's web site. The user selects dishwashers as the type of product they are interested in. The user may then be directed to a user interface similar to website user interface layout 300. The website interface layout 300 may present to the user the most popular or most commonly purchased items of the product type (e.g., 1, 5, or 10 dishwashers selected based on the highest sales or popularity). Within the listing of each item, a first available delivery and service date may be displayed.

When the user interacts with the user interface control to specify delivery and/or service date information, a search engine may perform a query to generate the list of matching products with the delivery and service date information. The parameters of the query may include the product type and a geographic identifier for the user, such as a zip code. The search engine queries the cached and indexed data from the large product pre-coordination calculations to identify a list of products for the product type and the first available delivery and service date based on the geographic identifier for the user. The user interface may also include options for the user to further refine and filter the search results. For example, the user may select a preferred brand name, product feature, or a specific date/time for delivery and service.

Performing the large product pre-coordination calculation for a set of products in a product type, such as the most popular products, and indexing the results, prior to receiving the search, allows for displaying pre-calculated information to the user without any significant time delay. This information may present to the user the most popular products with the earliest available delivery and service date, thus presenting a highly relevant data to the user without requiring the user to perform a detailed product review or query of scheduling/installation systems.

The website user interface layout 300 may offer an option for a user to pay a premium for prioritized delivery on a particular day. The premium may provide for a user to select a preferred time for delivery. The premium may provide for a user to schedule a delivery on a day that is indicated that standard delivery is not available. For example, a user may prefer a delivery on Wednesday, but deliveries to their address area are fully scheduled for Wednesday. Through the premium payment, the user may still schedule a delivery for Wednesday. The delivery may be accomplished by utilizing a delivery vehicle from outside the user's address area that has capacity.

FIG. 4 illustrates a user interface layout 400 adapted to present and receive information and selection options for product delivery and services according to an example described herein. For example, the user interface layout 400 may embody features of the user interface 116 described above. As shown in FIG. 4, the user interface layout 400 provides an interface with a number of information selection and display options, specifically depicting search results 420 for a particular product type (a brand of washing machine). It will be understood that the example of the user interface layout 400 is not limited to the presentation of appliances, as other types of products, product features, and accompanying services may also be presented or advertised.

The user interface layout 400 specifically depicts the listing of three products for purchase, in addition to search options (410A-410E) that can refine or limit the search results. As shown, the search options include a series of user interface checkboxes that allow the inclusion or exclusion based on product features (product color 410A and product capabilities 410B), and availability, specifying options to either pick up the item today (410C), a delivery date for the product (410D), or a delivery and installation date for the product (410E), with installation being an example type of service that is offered to accompany the product. For example, a consumer may choose to select one or more of the user interface checkboxes to expand or limit the search results 420. Further, the presented search results may be limited by delivery or pickup criteria, such as a selection option 430 to present only search results that are available for immediate pick up at a location.

The information that is presented in the search results 420 may include product delivery dates and product service dates, produced from the cached availability of scheduling and service evaluated by the large product pre-coordinating search engine discussed above. The selections by a user, such as specifying a product type and a delivery and installation date, may be used to refine the products listed. If the user selects an availability option (410C, 410D, or 410E), the products listed may be refined based on the availability option and displayed with a badge 432 to alert the user that the item fulfills their availability request. Accompanying each product listing is an indication of availability (426A, 426B, and 426C). The large product pre-coordinating search engine determines and supplies the information for badge 432 and availability display. For example, information presented for a first product may include a corresponding first delivery charge 422A, a store pickup date 424A, and a delivery with installation service date 426A; the information presented for a second and third product may include a corresponding second and third delivery charge 422B, 422C, a store pickup date 424B, 424C, and a delivery with installation service date 426B, 426C. Each of the search results may include a purchase selection option, such as respective "Add to Cart" buttons 428A, 428B, 428C for the first, second, and third buttons.

Figure 5:
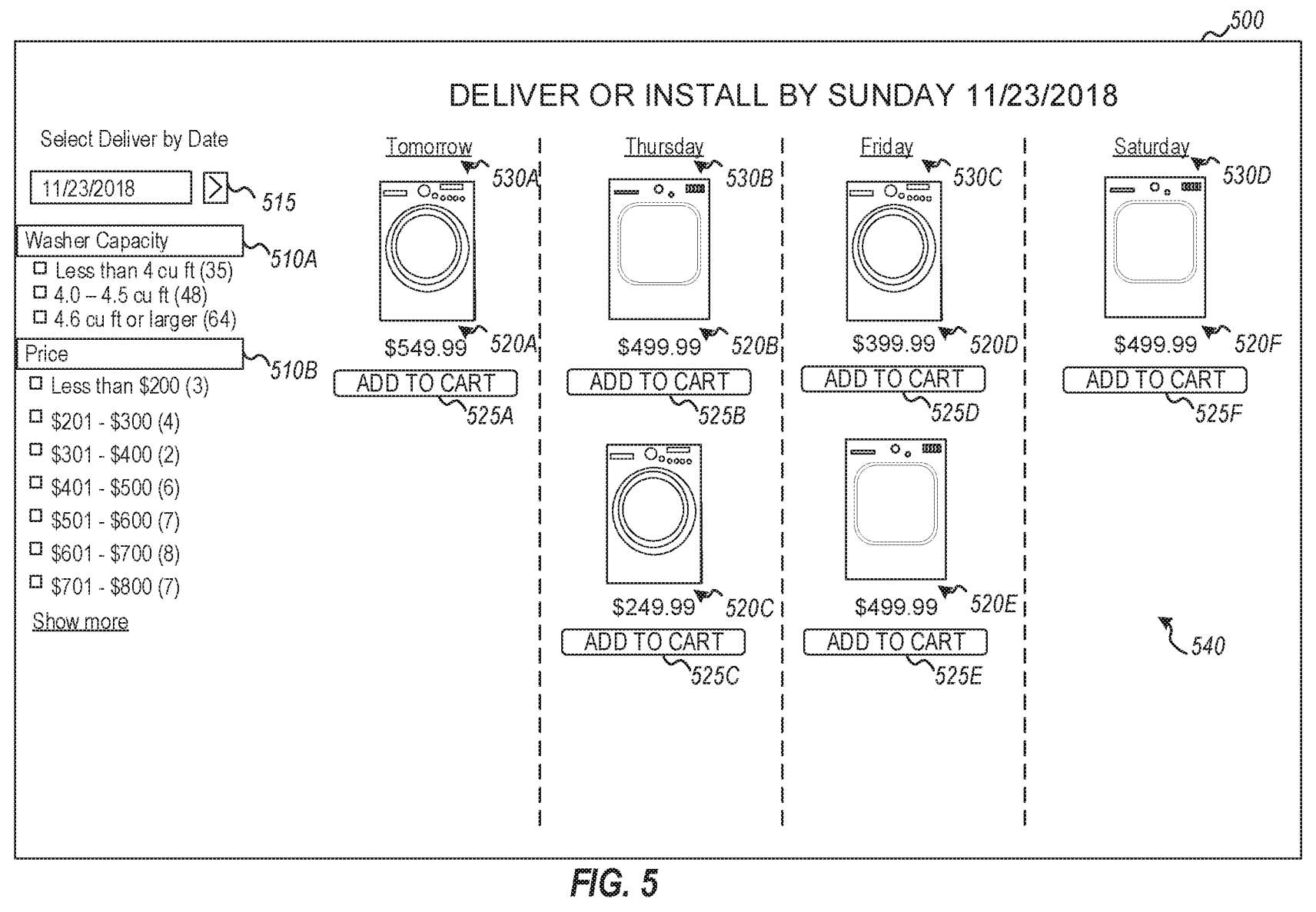

FIG. 5 illustrates a user interface layout 500 adapted to present and receive information and selection options for product delivery scheduling options, according to various embodiments. For example, the user interface layout 500 may embody features of the user interface 116 described above. The sample website user interface layout 500 includes a user interface control to refine the search results based on an availability, including the option to select a deliver by date. It will be understood that the example of the user interface layout 500 is not limited to the presentation of appliances, as other types of products, product features, and accompanying services may also be presented or advertised.

The user interface layout 500 specifically depicts the listing of products (520A-520F) for purchase with delivery and installation by a given date, in this example by Sunday Nov. 23, 2018. As shown, the search options include a series of user interface checkboxes that allow the inclusion or exclusion based on product features (washer capacity 510A), and pricing 510B. For example, a consumer may choose to select one or more of the user interface checkboxes to expand or limit the search results 540. Further, the presented search results 540 may be limited by delivery or installation criteria, such as a selection option 515 to present only search results 540 that are available before a particular date.

The information that is presented in the search results 540 may include product delivery dates and product service dates, produced from the cached availability of scheduling and service evaluated by the large product pre-coordinating search engine discussed above. The selections by a user, such as specifying a product type and a delivery and installation due date, may be used to refine the products listed. The products may then be listed by day (530A-530D), based on the determined delivery and installation date. This listing of results 540 may provide a user or consumer with options to select a product (520A-520F) that meets both their product preference and delivery deadline. Each of the search results 540 may include a purchase selection option, such as respective "Add to Cart" buttons 525A-525F.

As an example, a user may select a general product type they are interested in. For example, a distressed user may have a broken dishwasher and visits a retailer's web site. The user selects dishwashers as the type of product they are interested in. The user may then be directed to a user interface similar to website user interface layout 500. The website interface layout 500 may request the user select a deliver by date 515. The website interface layout 500 may present to the user products of the selected product type which may be delivered and installed before the deliver by date 515. The presentation may be in a format by days of the week 530A-530D. This may provide to a user an option of selecting a desired product within a specified timeframe. For example, a user may not be satisfied with the products available for delivery tomorrow 530A or Thursday 530B, but may be willing to wait until Friday 530C for a desired product 520D.

In user interface layout 300, user interface layout 400, and user interface layout 500 the products may be presented in a certain order. As filters are applied to the products for display the factors used to prioritize the products may vary. Different factors, such as what users search for may "plus" the priority of products, and thus raise its priority for presentation. Another factor may be a new product feature. Products with the new product feature may be prioritized to assist customers interested in that feature to identify those products first. For example, if users are frequently searching for "Samsung washer", then the user interface layout may present a Samsung washer near the top when a user begins a search for washing machines. Similarly, if the user has filtered to a particular brand, other factors may be used to determine the prioritized display of products, such as price, ratings, and speed of possible delivery. For example, top load washing machines may be the best-selling type of washing machine, thus after the user has selected a preferred brand, the prioritized products presented are top load washing machines.

In user interface layout 300, user interface layout 400, and user interface layout 500, each includes tools for filtering the product results presented. For example, user interface layout 300 includes search options (310A-310E), user interface layout 400 includes search options (410A-410E), and user interface layout 500 includes washer capacity 510A and pricing 510B. These filter options may be product specific, such as a washing machine capacity, or may be general, such as color or pricing. The user interface layouts may include options for sorting the products presented, such as selection option 330 and selection option 430. Additional sorting options may include popularity (e.g. best selling or commonly searched), price, ratings, popular brands, and speed of delivery.

Figure 6:
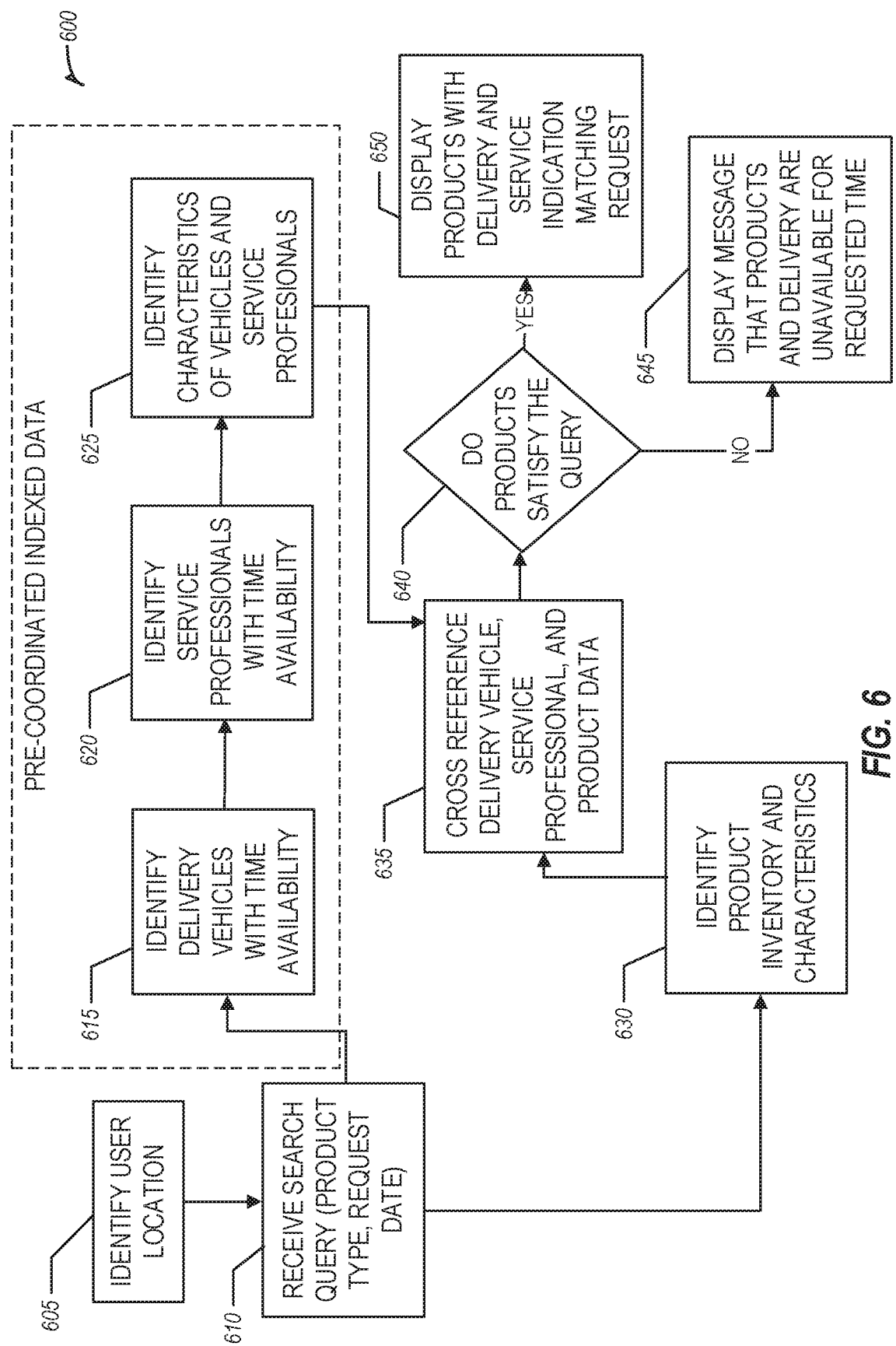
FIG. 6 illustrates an example of a process for generating website interface outputs for a large product pre-coordinating search engine, according to various embodiments.

FIG. 6 illustrates an example of a process 600 for generating website interface outputs for a large product pre-coordinating search engine, according to an embodiment. The process 600 may be used by the large product pre-coordinating search engine to select products on the basis of corresponding availability dates and related service/installation/delivery information.

At operation 605, the user's location may be determined (e.g., by the geolocation detector 210 as described in FIG. 2). For example, information from a profile of the user, the user's IP address, input received. GPS, etc. may be used to determine the location of the user.

At operation 610, a search query may be received (e.g., by the input processor 215 as described in FIG. 2). For example, the user may submit a query for washing machines with a requested delivery and installation date of Jul. 15, 2018, which may be received for processing.

The process then takes two paths to determine if delivery and installation is available, and to determine the product inventory. Operations 615, 620, and 625 may be performed prior to the search query at a predetermined interval to generate a set of availability dates or windows for delivery and service for a set of geographic locations. The pre-coordinated delivery and service availability dates may be indexed and stored, such as in a table format. The pre-coordinated indexed data of operations 615, 620, and 625 allows for fast data look ups by the search engine when performing the user search query without performing new calculations and cross-references during the query.

At operation 615, the delivery vehicles with time availability are identified. This may be limited to a region or locality based on the user location information from operation 605. For example, it may be determined that Delivery Vehicle 1 (associated with Retail Location A) and Delivery Vehicle 3 (associated with Distribution Center) have time availability on Jul. 15, 2018, but Delivery Vehicle 2 (associated with Retail Location B) does not have availability on Jul. 15, 2018.

At operation 620, the service professionals (e.g., technicians, installers) with time availability are identified. The service professionals identified may be limited to a region or locality based on the user location information from operation 605. At operation 625, additional characteristics of the delivery vehicles and services professionals are identified. For the delivery vehicles, additional characteristics may include the originating location of the vehicle, the route and location of previously scheduled deliveries, and the remaining capacity of the delivery vehicle. For the service professionals, additional characteristics may include the types of products they are qualified to work with and locations of previously scheduled appointments.

At operation 630 (occurring concurrently with operations 615, 620, and 625), the product inventory for the requested product type is identified. The inventory may be limited to the locality provided from the user location information from operation 605. Products matching the product type requested from operation 610 are identified and for each of those products characteristics are identified such as location and size.

At operation 635, the identified data for the delivery vehicles, service professionals, and product inventory is cross-referenced to determine products with delivery and service availability fulfilling the request of the user. The data is cross-referenced to find a product with coordinated delivery and service to match the search query request. The cross-reference determination uses factors for the delivery vehicle including time schedule, location, currently scheduled route and delivery locations, and remaining capacity; factors for the service professional including availability, location, and skills; and factors for the product including location availability and size.

At decision 640, the results of the cross-reference from operation 635 are received. At decision 640, it may be determined if the cross-reference of operation 635 found any products that could also fulfill the request delivery and service date. If there are no products which meet the requested criteria, then at operation 645 a message is displayed to the user that there are no products available that satisfy the request. Operation 645 may display alternative dates for the user where a delivery and service are available. If there are products with delivery and service availability for the requested date, then at operation 650 the identified products are displayed with an indication that the delivery and service requested date is available for the product.

Although the preceding examples of FIGS. 3-6 discuss an example use case involving a website and website user interface (e.g., presented in a web browser), it will be understood that like user interfaces may be provided in other forms of software applications. For instance, a software app that executes on a mobile device (e.g., tablet, smartphone) may communication an application interface to obtain and output data and provide electronic commerce functionality. In a similar fashion, other forms of electronic shopping carts and shopping scenarios may be employed, including in shopping scenarios that differ from typical website checkout interfaces.

In a further example, in addition to the search results discussed above, additional logic may be used to output, sort, or filter special search results based on considerations such as a user profile (e.g., a preferred customer), geographic area, or the like. In still a further example, logic may be used to offer and present special shipping incentives (e.g., fast shipping, free delivery, additional scheduling slots) based on user profile, geographic area, or the like.

Figure 7:
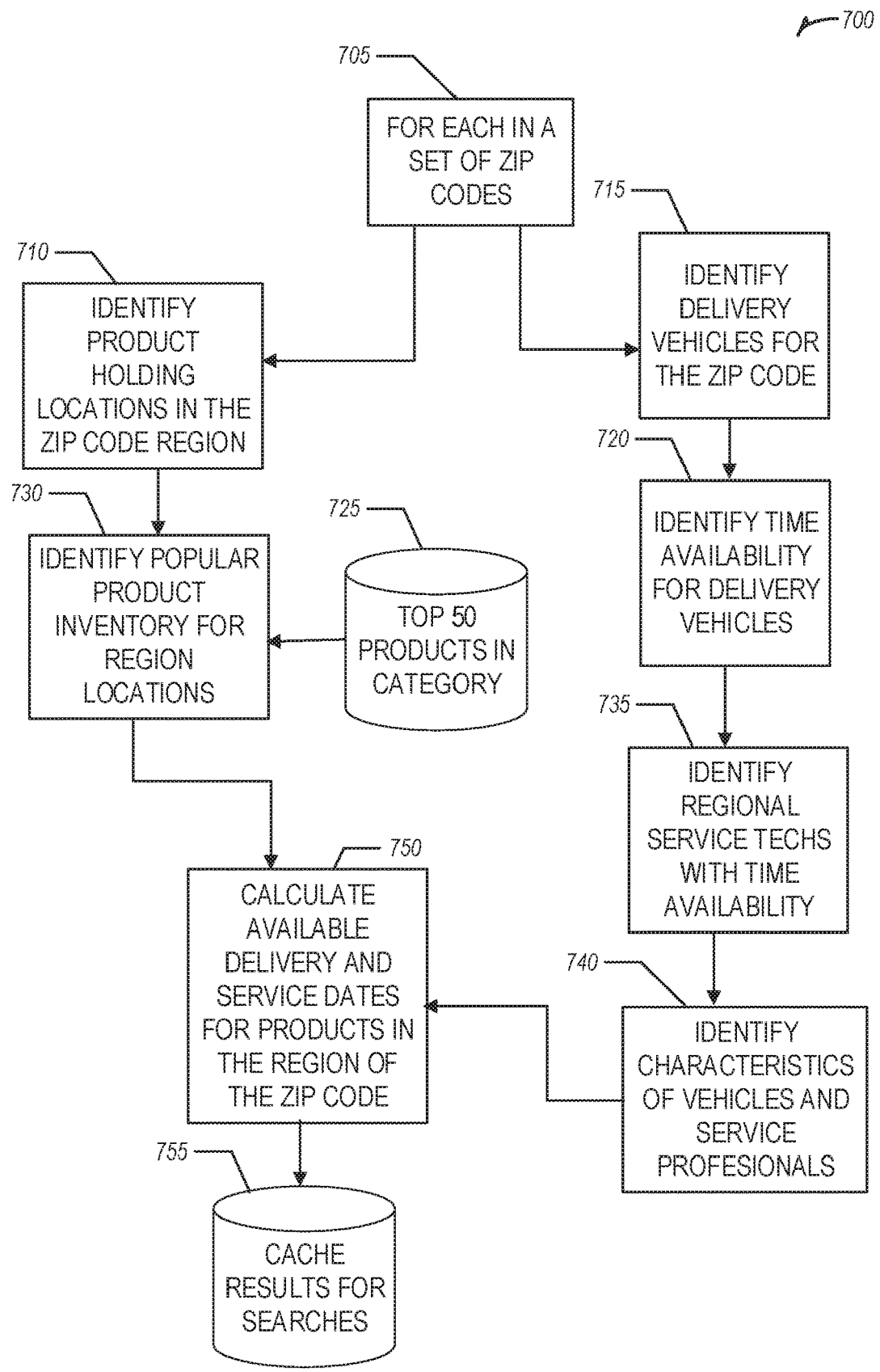
FIG. 7 illustrates an example of a process for generating a pre-cached delivery and service data for a product search engine, according to various embodiments.

FIG. 7 illustrates an example of a process 700 for generating a pre-cached delivery and service data for a product search engine, according to an embodiment. The process 700 may be used by the large product pre-coordinating search engine to pre-cache large products and available delivery and service times for a set of zip codes. The operations of process 700 may be performed on a server or across multiple servers and the results may be stored in a database or across multiple databases for use with a product search engine.

At operation 705 a delivery zip code from a set of zip codes is provided to the process 700. The set of zip codes may be a determined most common set of zip codes or all zip codes. The process 700 uses zip codes, but any geographic identifier may be used, such as identifiers for cities, geographic coordinates, or defined regions.

The process 700 has two concurrent operational processes to identify the product availability and the delivery and service availability. At operation 710, using the provided zip code, large product storage locations near the zip code are identified. This may include retail stores, distribution centers, and warehouses near the provided zip code.

At operation 730, the large product storage locations are received as well as the data for the most popular or most commonly purchased products in a category from a database 725. For example, in the database 725 may provide the top 50 most popular appliances or saleable units. The operation 730, uses the product data provided from database 725 to determine the inventory of the popular products at the large product storage locations identified in operation 710. The operation 730 also identifies characteristics about the products, such as the size. The result of operation 730 is the inventory for each of the popular products at each of the identified large product storage locations.

At operation 715, using the provided zip code, delivery vehicles which may make deliveries to the provided zip code are identified. At operation 720, using the identified delivery vehicles, the available delivery times for the identified delivery vehicles is identified. For example, delivery vehicle A may make deliveries to zip code 85254 and currently has deliveries scheduled for Nov. 8, 2018 at 9:00 AM and 11:00 AM.

At operation 735, service technicians for the area of the provided zip code are identified including their time availability. At operation 740, additional characteristics of the identified delivery vehicles and identified service technicians are identified, such as the capacity of the delivery vehicles, the locations of currently scheduled deliveries, and the skills of the available service technician or service provider.

At operation 750, the results of operation 730 and operation 740 are provided to calculate the available delivery and service dates for the popular products in the region of the provided zip code. The calculation includes cross-referencing the identified data to determine the available delivery and service dates to the provided zip code for each of the popular categories. This cross-reference includes using data for the inventory and location of the popular products, the size of the popular products, the time and location schedule of the delivery vehicles, the capacity and non-claimed capacity of the delivery vehicles, the schedule of the service technician, and the skills of the service technician.

The calculated result of operation 750 is stored or cached, such as in database 755. The cached data is made accessible for the product search engine to identify large products with delivery and service availability dates for user searches. The process 700 may be repeated and stored in database 755 for each zip code.

Figure 8:
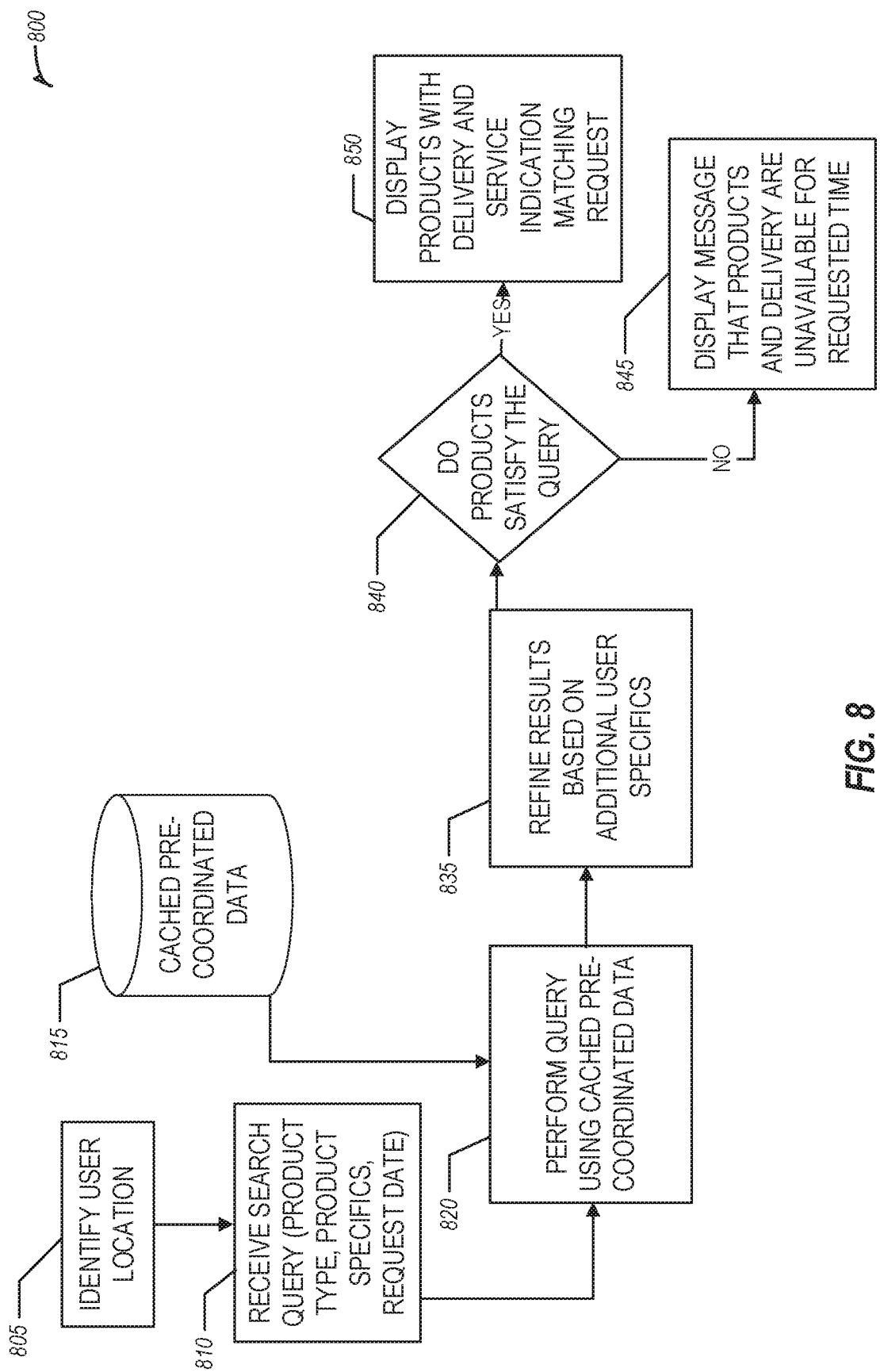
FIG. 8 illustrates an example of a process for generating website interface outputs for a large product pre-coordinating search engine, according to various embodiments.

FIG. 8 illustrates an example of a process 800 for generating website interface outputs for a large product pre-coordinating search engine, according to an embodiment. The process 800 may be used by the large product pre-coordinating search engine to select products and provide corresponding availability dates and information.

At operation 805, the user's location may be determined (e.g., by the geolocation detector 210 as described in FIG. 2). For example, information from a profile of the user, the user's IP address, input received. GPS, etc. may be used to determine the location of the user.

At operation 810, a search query may be received (e.g., by the input processor 215 as described in FIG. 2). For example, the user may submit a query for washing machines with a requested delivery and installation date of Jul. 15, 2018, which may be received for processing. The user may provide additional specifics to narrow their search query, such as a brand name or a feature of the product.

At operation 820, the search query limitations are received and used to retrieve data from the cached pre-coordinated data 815. The cached pre-coordinated data 815 may be the data generated from process 800. Based on the search query limitations, such as the product type, the requested date, and the location, corresponding products with available delivery and service dates for the specified location are retrieved from the cached pre-coordinated data 815.

At operation 835, if the user provided additional specifics, then the data resulting from operation 820 may be further refined. For example, operation 820 may have retrieved the data for the most popular washing machines which can be delivered on Jul. 16, 2018 to zip code 85287. The user may wish to further refine those results to only washing machines with 3.5 cubic foot capacity.

At decision 840, the results of the query and refinement from operations 820 and 835 are received. At decision 840, it may be determined if query and refinement from operations 820 and 835 found any products that fulfill the user search query. If there are no products which meet the requested criteria, then at operation 845 a message is displayed to the user that there are no products available that satisfy the request. Operation 845 may display alternative dates for the user where a delivery and service are available. If there are products with delivery and service availability for the requested date, then at operation 850 the identified products are displayed with an indication that the delivery and service requested date is available for the product.

Figure 9:
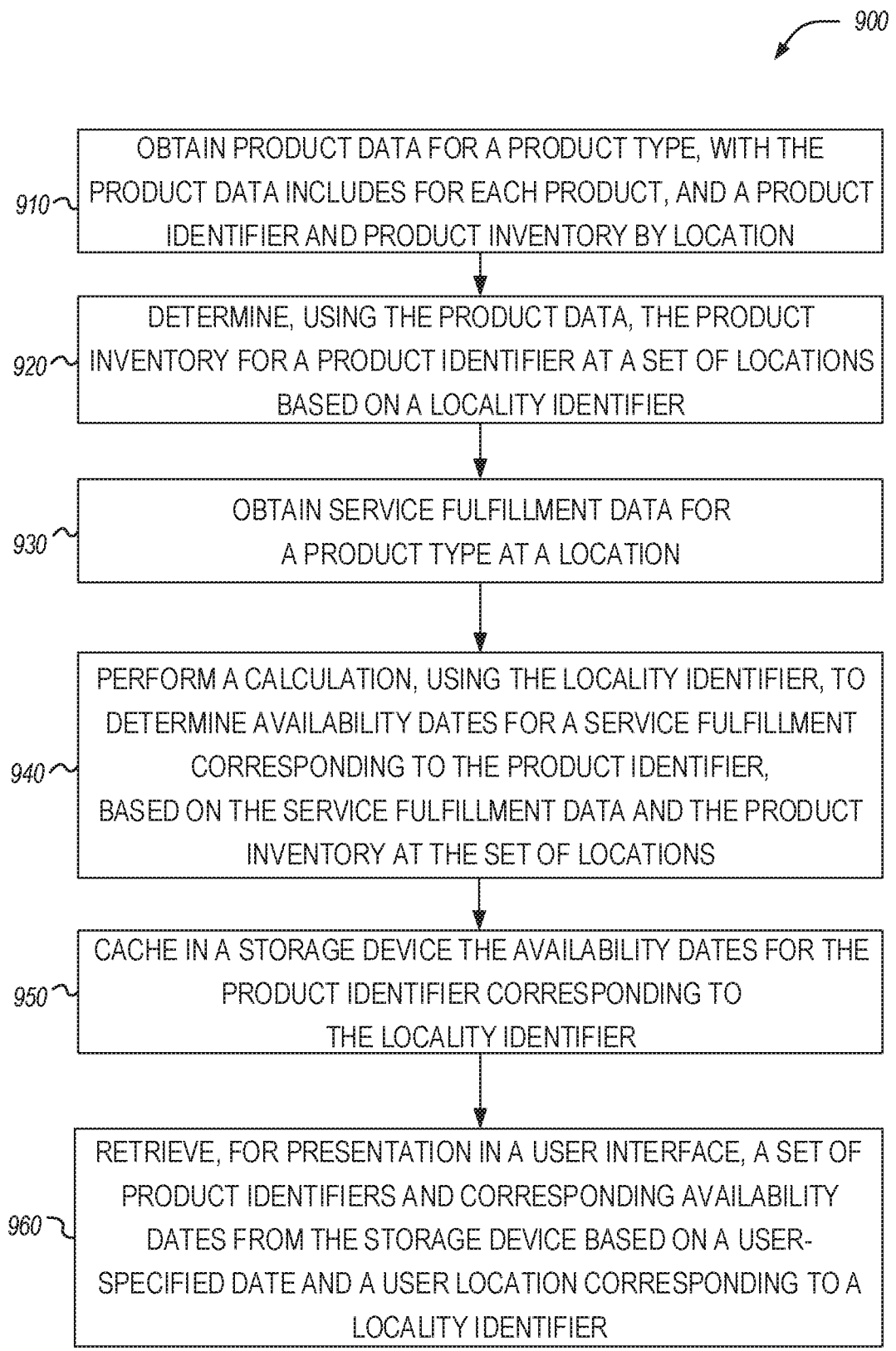
FIG. 9 illustrates a flowchart of an example method for obtaining and presenting pre-coordinated service fulfillment availability information, according to various embodiments.

FIG. 9 illustrates a flowchart 900 of an example method for obtaining and presenting pre-coordinated service fulfillment availability dates, according to various embodiments. It will be understood that the operations of the flowchart 900 may be implemented in connection with a computer-implemented method, instructions on a computer readable medium, or on a configuration of a computing device (or among multiple of such methods, products, or computing devices). In an example, the electronic operations are performed by a computing device that operates as a server to host and generate features of a client-accessible user interface (e.g., from a web server); in another example, the electronic operations are performed within aspects of distributed or client computing devices used to present the user interface.

As shown, the operation of the flowchart 900 may commence to obtain product data for a product type, such as in a scenario where the product data includes a product identifier and product inventory by location for each product (operation 910). The operations of the flowchart 900 may continue to identify, from a ranking of product purchases, a subset of product identifiers corresponding to the product purchases with a ranking in the upper half of the rankings, where the subset of the product identifiers defines the product identifiers in the product data. The product data may include a product size.

The operations of the flowchart 900 continue to determine, using the product data, the product inventory for a product identifier at a set of locations based on a locality identifier (operation 920). The locality identifier may be one of a zip code, city, metropolitan area, county, state, or other geographical region.

The operations of the flowchart 900 continue to obtain service fulfillment data for a product type at a location (operation 930). The service fulfillment data may include delivery vehicle data, which may include delivery vehicle capacity and a schedule of time and location. The delivery vehicle data may include a set of delivery locations identified by a location identifier, such as a set of zip codes the delivery vehicle is authorized for delivering products. The service fulfillment data may include service technician data, which may include a time schedule and service fulfillment skills.

The operations of the flowchart 900 continue to perform a calculation, for the locality identifier, to determine availability dates for a service fulfillment of a product corresponding to the product identifier using the service fulfillment data and the product inventory at the set of locations (operation 940).

The operations of the flowchart 900 continue to cache in a storage device the availability dates for the product identifier corresponding to the locality identifier (operation 950).

The operations of the flowchart 900 continue to retrieve a set of product identifiers and corresponding availability dates from the storage device for presentation in a user interface based on a user specified date and a user location corresponding to a locality identifier (operation 960). The presentation in the user interface may include an indication of an earliest possible availability date from the availability dates for each product identifier.

Figure 10:
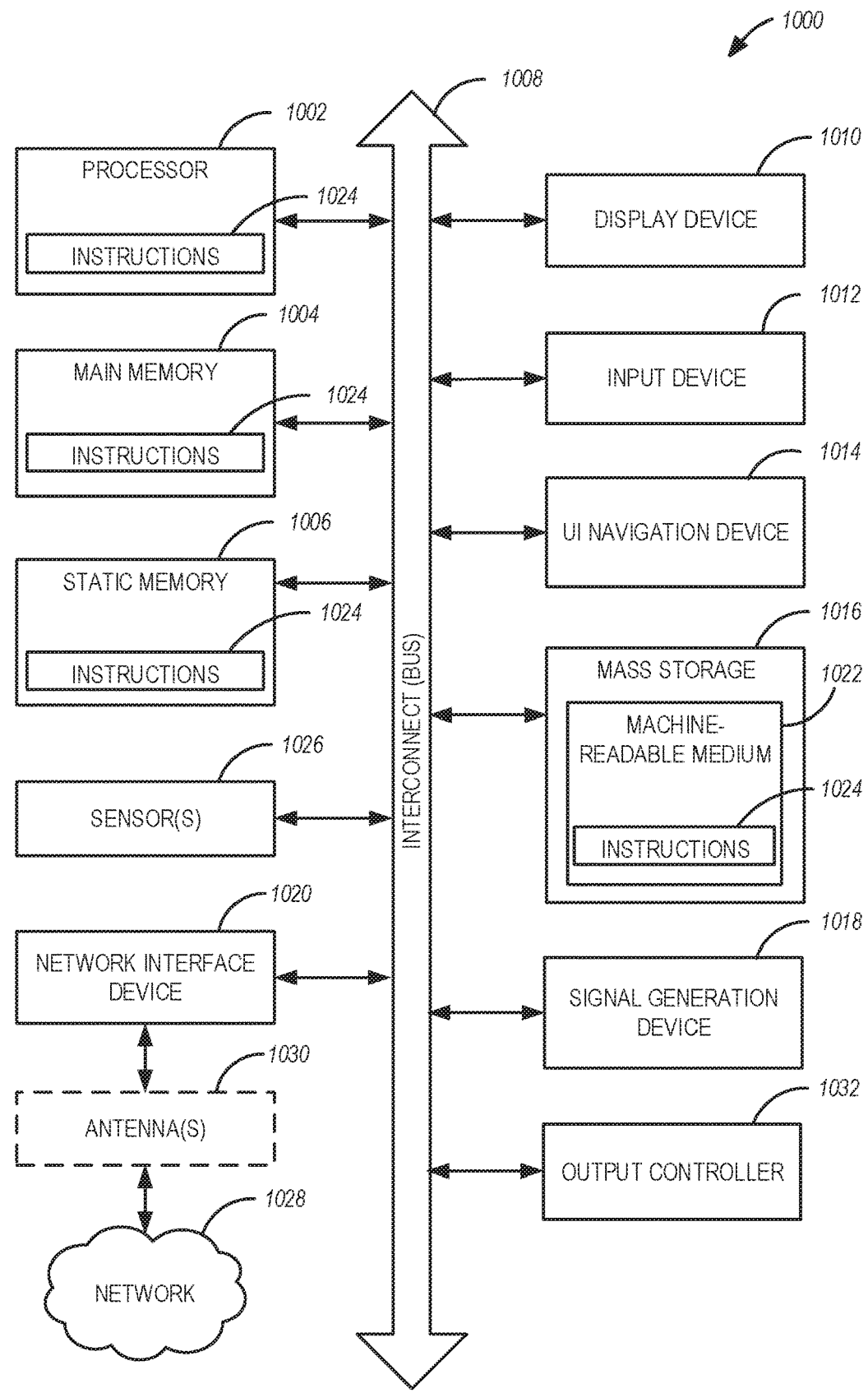
FIG. 10 is a block diagram illustrating an example of a computing machine upon which one or more embodiments may be implemented.

FIG. 10 is a block diagram illustrating components of a machine 1000 which according to some example embodiments is able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. The instructions 1016 transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store instructions (e.g., instructions 1016) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. For example, in addition to a speaker, the output components 1052 may include a visual output device adapted to provide augmented visual colors, animations, and presentation of information that is determined to best communicate and improve the user's mood to an optimal state as described herein. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure bio-signals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or other suitable device to interface with the network 1080. In further examples, the communication components 1064 may include wired communication components, wireless communication components, cellular communication components, Near Field Communication (NFC) components, Bluetooth® components (e.g., Bluetooth® Low Energy). Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components, or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

In various example embodiments, one or more portions of the network 1080 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS). High Speed Packet Access (HSPA), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

Example 1 is a method, comprising a plurality of electronic operations executed with a processor and memory of a computing device, the plurality of electronic operations including: obtaining product data for a product type, in which the product data includes, a product identifier and product inventory by location for respective products of the product type; determining, using the product data, the product inventory for a product corresponding to a respective product identifier, where the product inventory is determined from at least one delivery source location based on a locality identifier; obtaining service fulfillment data for the product type, and where the service fulfillment data includes service information by location corresponding to the product type; performing a calculation, based on the locality identifier and the service fulfillment data, to determine availability dates for service fulfillment of the respective products corresponding to the respective product identifiers at the location corresponding to the locality identifier; caching, in a storage device, the availability dates for service fulfillment of the respective products, in which the cached availability dates correspond to the respective product identifier and the locality identifier; and retrieving corresponding availability dates from the storage device of the respective products for presentation in a user interface, in response to a query including a user-specified date and a user location corresponding to the locality identifier.

In Example 2, the subject matter of Example 1 includes, the plurality of electronic operations further including: identifying, from a ranking of product purchases, a subset of product identifiers corresponding to products having a ranking in an upper half of the ranking of product purchases; where the subset of the product identifiers defines the respective products of the product type obtained in the product data.

In Example 3, the subject matter of Examples 1-2 includes, the presentation in the user interface having an indication of an earliest possible availability date from the availability dates for each product identifier.

In Example 4, the subject matter of Examples 1-3 includes, the product data defines a product size.

In Example 5, the subject matter of Examples 1-4 includes, the locality identifier corresponds to a: zip code, city, metropolitan area, county, state, or geographical region.

In Example 6, the subject matter of Examples 1-5 includes, the service fulfillment data defines delivery vehicle data.

In Example 7, the subject matter of Example 6 includes, the delivery vehicle data defines delivery vehicle capacity and a schedule of time and location.

In Example 8, the subject matter of Examples 6-7 includes, the delivery vehicle data defines a set of delivery locations identified by a location identifier.

In Example 9, the subject matter of Examples 1-8 includes, the service fulfillment data defines service technician data.

In Example 10, the subject matter of Example 9 includes, the service technician data defines a time schedule and service fulfillment skills.

Example 11 is a system for identifying a set of products and corresponding service fulfillment dates, comprising: at least one processor; and memory including instructions that, when executed by the at least one processor, cause the at least one processor to: obtain product data for a product type, where the product data includes, a product identifier and product inventory by location for respective products of the product type; determine, using the product data, the product inventory for a product corresponding to a respective product identifier, in which the product inventory is determined from at least one delivery source location based on a locality identifier; obtain service fulfillment data for the product type, where the service fulfillment data includes service information by location corresponding to the product type; perform a calculation, based on the locality identifier and the service fulfillment data, to determine availability dates for service fulfillment of the respective products corresponding to the respective product identifiers at the location corresponding to the locality identifier; cache, in a storage device, the availability dates for service fulfillment of the respective products, where the cached availability dates correspond to the respective product identifier and the locality identifier; and retrieve corresponding availability dates from the storage device of the respective products for presentation in a user interface, in response to a query including a user-specified date and a user location corresponding to the locality identifier.

In Example 12, the subject matter of Example 11 includes, instructions to: identify, from a ranking of product purchases, a subset of product identifiers corresponding to products having a ranking in an upper half of the ranking of product purchases; where the subset of the product identifiers defines the respective products of the product type obtained in the product data.

In Example 13, the subject matter of Examples 11-12 includes, the presentation in the user interface having an indication of an earliest possible availability date from the availability dates for each product identifier.

In Example 14, the subject matter of Examples 11-13 includes, the product data defines a product size.

In Example 15, the subject matter of Examples 11-14 includes, the locality identifier corresponds to a: zip code, city, metropolitan area, county, state, or geographical region.

In Example 16, the subject matter of Examples 11-15 includes, the service fulfillment data defines delivery vehicle data.

In Example 17, the subject matter of Example 16 includes, the delivery vehicle data defines delivery vehicle capacity and a schedule of time and location.

In Example 18, the subject matter of Examples 16-17 includes, the delivery vehicle data defines a set of delivery locations identified by a location identifier.

In Example 19, the subject matter of Examples 11-18 includes, the service fulfillment data defines service technician data.

In Example 20, the subject matter of Example 19 includes, the service technician data defines a time schedule and service fulfillment skills.

Example 21 is at least one non-transitory computer readable medium including instructions for identifying a set of products and corresponding service fulfillment dates that when executed by at least one processor, cause the at least one processor to: obtain product data for a product type, where the product data includes, a product identifier and product inventory by location for respective products of the product type; determine, using the product data, the product inventory for a product corresponding to a respective product identifier, in which the product inventory is determined from at least one delivery source location based on a locality identifier; obtain service fulfillment data for the product type, where the service fulfillment data includes service information by location corresponding to the product type; perform a calculation, based on the locality identifier and the service fulfillment data, to determine availability dates for service fulfillment of the respective products corresponding to the respective product identifiers at the location corresponding to the locality identifier; cache, in a storage device, the availability dates for service fulfillment of the respective products, where the cached availability dates correspond to the respective product identifier and the locality identifier; and retrieve corresponding availability dates from the storage device of the respective products for presentation in a user interface, in response to a query including a user-specified date and a user location corresponding to the locality identifier.

In Example 22, the subject matter of Example 21 includes, instructions to: identify, from a ranking of product purchases, a subset of product identifiers corresponding to products having a ranking in an upper half of the ranking of product purchases; where the subset of the product identifiers defines the respective products of the product type obtained in the product data.

In Example 23, the subject matter of Examples 21-22 includes, the presentation in the user interface having an indication of an earliest possible availability date from the availability dates for each product identifier.

In Example 24, the subject matter of Examples 21-23 includes, the product data defines a product size.

In Example 25, the subject matter of Examples 21-24 includes, the locality identifier corresponds to a: zip code, city, metropolitan area, county, state, or geographical region.

In Example 26, the subject matter of Examples 21-25 includes, the service fulfillment data defines delivery vehicle data.

In Example 27, the subject matter of Example 26 includes, the delivery vehicle data defines delivery vehicle capacity and a schedule of time and location.

In Example 28, the subject matter of Examples 26-27 includes, the delivery vehicle data defines a set of delivery locations identified by a location identifier.

In Example 29, the subject matter of Examples 21-28 includes, the service fulfillment data defines service technician data.

In Example 30, the subject matter of Example 29 includes, the service technician data defines a time schedule and service fulfillment skills.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second." and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method, comprising a plurality of electronic operations executed with a processor and memory of a computing device, the plurality of electronic operations including:
    obtaining product data for a product type, wherein the product data includes a product identifier and product inventory by location for respective products of the product type;
    determining, using the product data, the product inventory for a product corresponding to a respective product identifier, wherein the product inventory is determined from at least one delivery source location based on a locality identifier corresponding to a customer location;
    obtaining service fulfillment data for the product type, wherein the service fulfillment data includes service information by location corresponding to the product type;
    performing a calculation, based on the locality identifier and the service fulfillment data, to determine availability dates for service fulfillment of the respective products corresponding to respective product identifiers of the product inventory at the customer location corresponding to the locality identifier, wherein the service fulfillment requires delivery fulfillment of the product from the product inventory to the customer location;
    caching, at a first time in a cache of a storage device, the availability dates for delivery fulfillment and service fulfillment, of the respective products, wherein the cached availability dates are established with multiple data entries in the cache for the respective products available for fulfillment at the customer location, wherein a respective data entry of the cache corresponds to the respective product identifier and the locality identifier; and
    providing an output of the respective products and cached availability dates corresponding to the respective products within a user interface, the corresponding cached availability dates being retrieved from the cache of the storage device and provided in the output in response to a query initiated at a second, subsequent time within the user interface, wherein the query is used to retrieve the corresponding cached availability dates by providing a user-specified date and the customer location corresponding to the locality identifier.

2. The method of claim 1, the plurality of electronic operations further including:
identifying, from a ranking of product purchases, a subset of product identifiers corresponding to products having a ranking in an upper half of the ranking of product purchases;
wherein the subset of the product identifiers defines the respective products of the product type obtained in the product data and used for caching in the cache of the storage device.

3. The method of claim 1, wherein the output in the user interface includes an indication of an earliest possible availability date from the availability dates for each product identifier.

4. The method of claim 1, wherein the product data includes a product size.

5. The method of claim 1, wherein the locality identifier corresponds to a: zip code, city, metropolitan area, county, state, or geographical region.

6. The method of claim 1, wherein the service fulfillment data includes delivery vehicle data.

7. The method of claim 6, wherein the delivery vehicle data includes delivery vehicle capacity and a schedule of time and location.

8. The method of claim 6, wherein the delivery vehicle data includes a set of delivery locations identified by a location identifier.

9. The method of claim 1, wherein the service fulfillment data includes service technician data.

10. The method of claim 9, wherein the service technician data includes a time schedule and service fulfillment skills.

11. A system for identifying a set of products and corresponding service fulfillment dates, comprising:
at least one processor; and
memory including instructions that, when executed by the at least, one processor, cause the at least one processor to:
obtain product data for a product type, wherein the product, data includes a product identifier and product inventory by location for respective products of the product type;
determine, using the product data, the product inventory for a product corresponding to a respective product identifier, wherein the product inventory is determined from at least one delivery source location based on a locality identifier corresponding to a customer location;
obtain service fulfillment data for the product type, wherein the service fulfillment data includes service information by location corresponding to the product type;
perform a calculation, based on the locality identifier and the service fulfillment data, to determine availability dates for service fulfillment of the respective products corresponding to respective product identifiers of the product inventory at the customer location corresponding to the locality identifier, wherein the service fulfillment requires delivery fulfillment of the product from the product inventory to the customer location;
cache, at a first time in a cache of a storage device, the availability dates for delivery fulfillment and service fulfillment of the respective products, wherein the cached availability dates are established with multiple data entries in the cache for the respective products available for fulfillment at the customer location, wherein a respective data entry of the cache corresponds to the respective product, identifier and the locality identifier; and
providing an output of the respective products and cached availability dates corresponding to the respective products within a user interface, the corresponding cached availability dates being retrieved from the cache of the storage device and provided in the output in response to a query initiated at a second, subsequent time within the user interface, wherein the query is used to retrieve the corresponding cached availability dates by providing a user-specified date and the customer location corresponding to the locality identifier.

12. The system of claim 11, further comprising instructions to:
identify, from a ranking of product purchases, a subset of product identifiers corresponding to products having a ranking in an upper half of the ranking of product purchases;
wherein the subset of the product identifiers defines the respective products of the product type obtained in the product data and used for caching in the cache of the storage device.

13. The system of claim 11, wherein the output in the user interface includes an indication of an earliest possible availability date from the availability dates for each product identifier.

14. The system of claim 11, wherein the product data includes a product size.

15. The system of claim 11, wherein the locality identifier corresponds to a: zip code, city, metropolitan area, county, state, or geographical region.

16. At least one non-transitory computer readable medium including instructions for identifying a set of products and corresponding service fulfillment dates that when executed by at least one processor, cause the at least one processor to:
obtain product data for a product type, wherein the product data includes a product identifier and product inventory by location for respective products of the product type;
determine, using the product data, the product inventory for a product corresponding to a respective product, identifier, wherein the product inventory is determined from at least one delivery source location based on a locality identifier corresponding to a customer location;
obtain service fulfillment data for the product type, wherein the service fulfillment data includes service information by location corresponding to the product type;
perform a calculation, based on the locality identifier and the service fulfillment data, to determine availability dates for service fulfillment of the respective products corresponding to respective product identifiers of the product inventory at the customer location corresponding is the locality identifier wherein the service fulfillment requires delivery fulfillment of the product from the product inventory to the customer location;
cache, at a first time in a cache of a storage device, the availability dates for delivery fulfillment and service fulfillment of the respective products, wherein the cached availability dates are established with multiple data entries in the cache for the respective products available for fulfillment at the customer location, wherein a respective data entry of the cache corresponds to the respective product identifier and the locality identifier; and providing an output of the respective products and cached availability dates corresponding to the respective products within a user interface, the corresponding cached availability dates being retrieved from the cache of the storage device and provided in the output in response to a query initiated at a second, subsequent time within the user interface, wherein the query is used to retrieve the corresponding cached availability dates by providing a user-specified date and the customer location corresponding to the locality identifier.

17. The at least one computer readable medium of claim 16, further comprising instructions to:
identify, from a ranking of product purchases, a subset of product identifiers corresponding to products having a ranking in an upper half of the ranking of product purchases;
wherein the subset of the product identifiers defines the respective products of the product type obtained in the product data and used for caching in the cache of the storage device.

18. The at least one computer readable medium of claim 16, wherein the output in the user interface includes an indication of an earliest possible availability date from the availability dates for each product identifier.

19. The at least one computer readable medium of claim 16, wherein the product data includes a product size.

20. The at least one computer readable medium of claim 16, wherein the locality identifier corresponds to a: zip code, city, metropolitan area, county, state, or geographical region.

\* \* \* \* \*